United States Patent

Glorioso et al.

[11] Patent Number: 5,926,776
[45] Date of Patent: Jul. 20, 1999

[54] SMART THERMOSTAT HAVING A TRANSCEIVER INTERFACE

[75] Inventors: Charles A. Glorioso, Castro Valley, Calif.; William Wade Bassett, Wheaton, Ill.; Robert M. Russ, Jr., Los Altos Hills, Calif.

[73] Assignee: Gas Research Institute, Chicago, Ill.

[21] Appl. No.: 08/868,851

[22] Filed: Jun. 4, 1997

[51] Int. Cl.[6] ............................. G06F 15/16; F25B 29/00
[52] U.S. Cl. ........................... 702/130; 705/411; 165/12; 236/46 R
[58] Field of Search ..................................... 364/557, 492, 364/511, 464.04, 464.01, 493, 505, 140; 236/46 R, 91 D; 165/12–14; 702/130; 705/404, 409, 411; 340/825.06, 825.47

[56] References Cited

U.S. PATENT DOCUMENTS

| | | | |
|---|---|---|---|
| 5,289,362 | 2/1994 | Liebl et al. | 364/140 |
| 5,361,982 | 11/1994 | Liebl et al. | 236/46 |
| 5,598,349 | 1/1997 | Elliason et al. | 364/492 |

*Primary Examiner*—Kamini Shah
*Attorney, Agent, or Firm*—David R. Gildea

[57] ABSTRACT

A smart thermostat having a transceiver for two-way communication with an energy provider. The smart thermostat includes a temperature sensor for measuring a temperature, a user interface for displaying and receiving information to and from a user, a port connecting to a cooling or heating device, a processor, and the transceiver. The transceiver receives a current energy price from an energy provider. The user interface receives temperature setpoints and associated acceptable energy costs. The processor issues a control signal to the cooling or heating device to operate when the temperature is different than the temperature setpoint and the acceptable energy cost is not greater than the current price of energy. The transceiver transmits information for the control signal, temperature setpoints and associated costs to the energy provider. The energy provider may then predict the effect a change to the current energy price will have on energy demand, influence the demand in real time by adjusting the energy price, and verify from the smart thermostat that the demand was effected. The user interface displays a bill for an accumulated use of energy either calculated by the processor or downloaded from the energy provider. The user may authorize payment of the bill through the user interface and the transceiver to the energy provider. Both the user and the energy provider can transmit and receive information concerning an energy outage.

39 Claims, 4 Drawing Sheets

SMART THERMOSTAT HAVING A TRANSCEIVER INTERFACE

BACKGROUND OF THE INVENTION

1. Field of the Invention

The invention relates generally to thermostats and more particularly to a thermostat having a signal transceiver for two-way communication with an energy provider.

2. Description of the Prior Art

Thermostats have been used for many years for enabling a user to regulate the temperature of a space by setting a temperature setpoint. When the temperature within the space goes outside the temperature setpoint, the thermostat sends a signal to operate a cooling or heating device. The cooling or heating device converts energy, typically either electricity or gas, to cool or heat the space to bring the temperature to the setpoint.

Recently thermostat systems have been developed that include a microprocessor based controller and a pager receiver for receiving signal information or commands in the form of a paging signal from an energy provider such as a utility company. The energy provider issues information for the current price of energy, for example low, medium, high, or critical, in the paging signal. The user enters into the thermostat the temperature setpoints and the costs of energy that are acceptable to him for maintaining temperature at the temperature setpoints. For example, a user having a heater may enter a temperature setpoint of 70° F. for a low energy cost, 65° F. for a medium energy cost, 60° F. for a high energy cost, and 50° F. for a critical energy cost. Such system enables the user to manage his energy cost while enabling the energy provider to smooth energy demand peaks and to shed load during an energy crises situation. However, a limitation of such system is that it does not provide information to the energy provider for predicting the effect of a change in the price of energy upon the demand for energy or for verifying that an action effecting the demand has taken place.

SUMMARY OF THE INVENTION

It is therefore an object of the present invention to provide two-way signal communication between an energy user and an energy provider for transmitting user status information to the energy provider and enabling the energy provider to predict energy demand and verify that an action expected to effect energy demand has taken place.

Another object of the present invention is to provide signal transmission between an energy user and an energy provider for enabling the user to authorize payment of an energy bill.

Briefly, in a preferred embodiment, the present invention is a smart thermostat having a transceiver for two-way communication with an energy provider. The smart thermostat includes a temperature sensor for measuring a temperature, a user interface for displaying and receiving information to and from a user, a port connecting to a cooling or heating device, a processor, and the transceiver. The transceiver receives a current energy price level from an energy provider. The user interface receives temperature setpoints and associated acceptable energy cost levels from the user. The processor selects the temperature setpoint associated with the acceptable cost level that matches the current price level and issues a control signal to the cooling or heating device to operate when the temperature is different than the selected setpoint. The transceiver transmits information for the control signal, temperature setpoints and associated acceptable costs to the energy provider. The energy provider may then predict the effect a change to the current energy price will have on energy demand, influence the demand in real time by adjusting the energy price, and verify from the smart thermostat that the change in demand was effected. The user interface displays a bill for an accumulated use of energy either calculated by the processor or downloaded from the energy provider. The user may authorize payment of the bill through the user interface and the transceiver to the energy provider. Both the user and the energy provider can transmit and receive information concerning an energy outage.

An advantage of the smart thermostat of the present invention is that a user can reduce his energy cost by regulating temperature more loosely when the current price of energy is higher and more tightly when the price is lower.

Another advantage of the smart thermostat of the present invention is that a user can inform an energy provider of user status information such as information regarding a power outage.

Another advantage of the smart thermostat of the present invention is that an energy provider can predict a change in energy demand that will result from an adjustment in the price of energy.

Another advantage of the smart thermostat of the present invention is that an energy provider can verify that an action effecting energy demand has taken place.

Another advantage of the smart thermostat of the present invention is that payment of an energy bill may be authorized and the authorization transmitted to the energy provider.

These and other objects and advantages of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
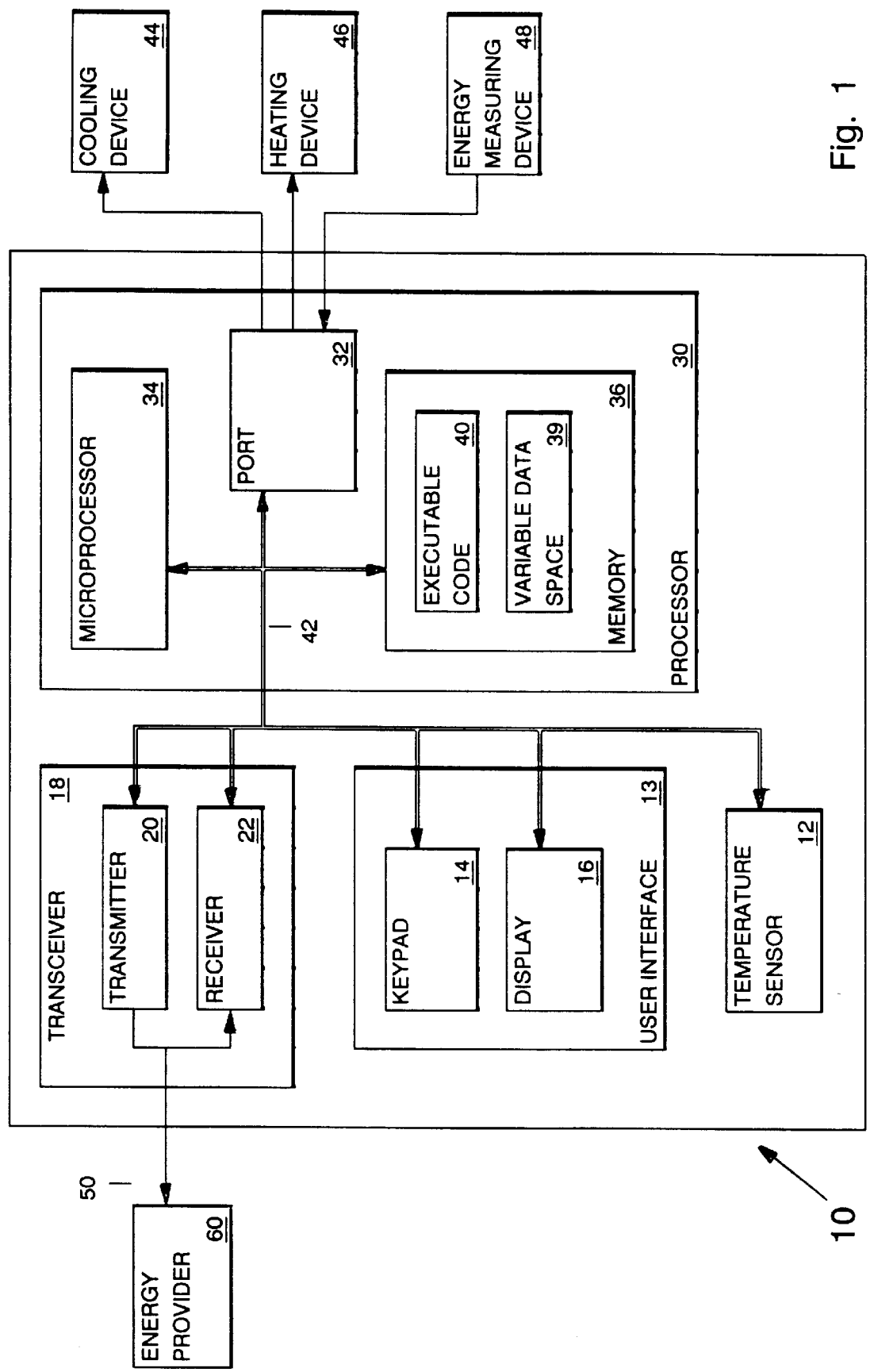
FIG. 1 is a block diagram of a smart thermostat of the present invention.

FIG. 1 illustrates a smart thermostat of the present invention and referred to by the general reference number 10. The smart thermostat 10 includes a temperature sensor 12; a user interface 13 including a user entry device such as a keypad 14 and a display 16; a transceiver 18 including a transmitter 20 and a receiver 22; and a processor 30. The processor 30 includes a port 32, a microprocessor 34, and a memory 36 including variable data space 39 and an executable code 40 having instructions for the microprocessor 34 for directing the actions of processor 30. The microprocessor 34 operates over a bus 42 for reading from the executable code 40 and the variable data space 39, writing to the variable data space 39, and receiving information and issuing commands to the elements of the smart thermostat 10. In a preferred embodiment the port 32 is connected to a cooling device 44 such as an air conditioner, a refrigerator, or a freezer and/or a heating device 46 such as a furnace, boiler, or an oven. The temperature sensor 12 is included within the space cooled or heated by the cooling device 44 or heating device 46, respectively. Optionally, the port 32 is connected to an energy measuring device 48 such as an electric meter or other appliance for receiving information for energy use.

Figure 2:
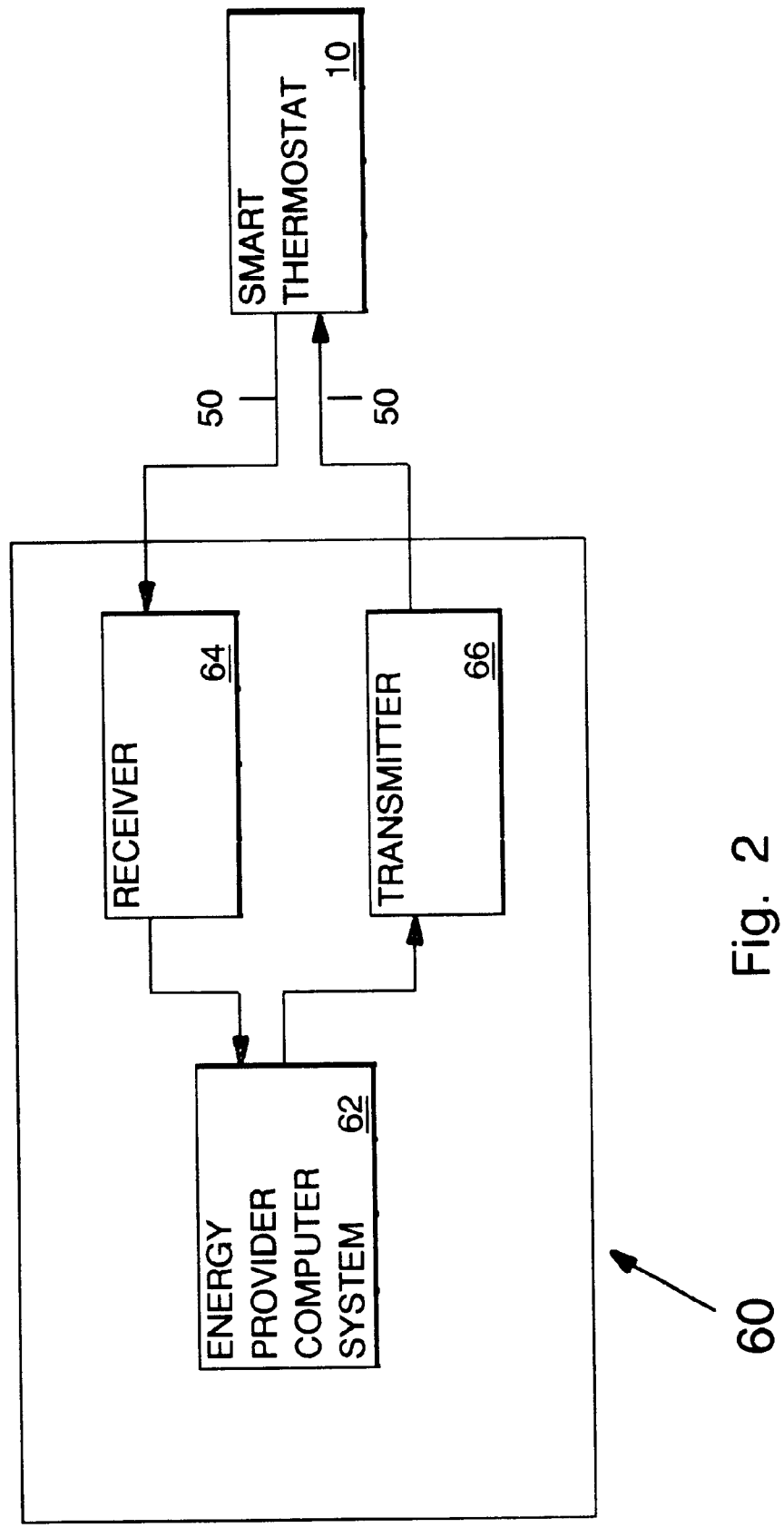
FIG. 2 is a block diagram of an energy provider of the present invention for communicating with the smart thermostat of FIG. 1.

The receiver 22 receives an input signal and the transmitter 20 transmits an output signal through a communication network 50 for two-way communication with at least one energy provider 60 (FIG. 2). The energy provider 60 (FIG. 2) is typically a utility company or other entity for producing, carrying, billing, or providing services for a source of energy such as gas or electricity. More than one energy provider 60 (FIG. 2) may be included where, for instance gas and electricity, are provided by separate entities. Preferably the communication network 50 includes local base stations for concentrating user status information targeted for the energy provider 60 (FIG. 2) received in the output signal with other information received from other remote devices and passing the concentrated information through a wide area network (WAN) to the targeted energy provider 60 (FIG. 2); and for receiving concentrated information from the energy provider 60 (FIG. 2) through the WAN, sorting the concentrated information, and transmitting the input signal to the targeted smart thermostat 10. The input signals, output signal, and the signals issued by the base stations and the energy provider 60 (FIG. 2) include digital switching bits for targeting the signals to the intended receiver. Such targeting and switching bits are conventional and well known in the art. The WAN may be wired or wireless and is commercially available from several sources including landline telephone companies such as Pacific Telesis Company, known as Pacific Bell of San Francisco, Calif., hybrid fiber optic and coax cable television companies, cellular telephone providers, cellular telephone providers having CDPD protocol for piggy backing digital data on an analog cellular telephone, providers of specialized wireless services such as Metricom of Los Gatos, Calif.

Preferably, the transceiver 18 communicates in signal bursts within a carrier frequency range of 902 to 928 MHz. The communications are originated by the smart thermostat 10 to the base station and continued on a scheduled basis thereafter. During each signal burst, the carrier signal frequency hops in a pseudo-random sequence through fifty of one-hundred twenty-eight designated frequency channels with the frequency range. User status information in the output signal and information received from the energy provider 60 (FIG. 2) in the input signal are carried by frequency shift key (FSK) modulation at a rate of about two kilo baud and a deviation of about six kilohertz. In operation, the transmitter 20 transmits the output signal in signal bursts at scheduled times to the base station. The base station receives the output signal and responds to the output signal burst by transmitting the input signal as a signal burst that is received by the receiver 22. The round trip of the signal bursts is less than four-hundred milliseconds long in order to meet a Federal Communications Commission (FCC) regulation for spread spectrum communication. The transceiver 18 and the base station for receiving and transmitting such wireless signals are disclosed in the U.S. Pat. No. 5,734,966 filed Jan. 20, 1995 by Farrer et al. and incorporated herein by reference. Of course, other frequency ranges, signal formats, and modulation schemes could as well be used and the invention does not depend upon the specific frequency range, signal format, and modulation scheme described above.

In operation, the receiver 22 receives the input signal including a current price level for energy issued by the energy provider 60 (FIG. 2) via the communication network 50. A user of the smart thermostat 10 enters temperature setpoints and associated energy costs, for example, low, medium, high, or critical, that are acceptable to him for maintaining temperature below or above the setpoints. For example, a user having a heater may enter a temperature setpoint of 70° F. for a low energy cost, 65° F. for a medium energy cost, 60° F. for a high energy cost, and 50° F. for a critical energy cost. A user having an air conditioner may enter a temperature setpoint of 72° F. for a low energy cost, 77° F. for a medium energy cost, 82° F. for a high energy cost, and no setpoint for a critical energy cost. The processor 30 issues a control signal through the port 32 for operating the cooling device 44 and/or heating device 46 when the temperature is different than the temperature setpoint associated with the acceptable energy cost level. In the above example for the heating device 46, when the current energy price is high, the control signal would issue control information for operating the heating device 46 when the temperature fell to 60° F. or below. For the cooling device 44, the control signal would issue control information for operating the cooling device 44 when the temperature rose to or above 82° F. The transmitter 20 transmits information in the output signal for the control signals, temperature, temperature setpoints and associated acceptable cost levels. Additionally, the receiver 22 may receive information for an energy bill for usage of energy during a time period. The user may then authorize payment of the energy bill and have the authorization transmitted to the energy provider 60 (FIG. 2) in the output signal. The elements and operation of the user interface 13, the transceiver 18, and the processor 30 are further described in the detailed descriptions of the methods of operation accompanying the illustrations of FIGS. 3 and 4 below.

FIG. 2 illustrates the energy provider of the present invention and referred to by the general reference number 60. The energy provider 60 includes a computer system 62 including software for monitoring and adjusting energy supply and demand and computing energy bills for individual energy consumers; and a receiver 64 and a transmitter 66 coupled through the communication network 50 for two-way communication with the smart thermostat 10. The software includes code for using information for the temperature setpoints and associated acceptable costs received from the smart thermostat 10 for predicting the effect that a change in the current price of energy will have upon energy demand. The software further includes code for verifying that an action has taken place at the smart thermostat 10 and calculating the effect of that action upon energy demand.

The transmitter 66 issues information for the current price of energy, for example low, medium, high, or critical, into the communications network 50 for reception by one or more units, typically many units, of the smart thermostat 10. The energy prices may vary depending upon energy use brackets for the accumulated use of energy of a particular user within a time period and for different categories of consumers. The receiver 64 receives user status information from the smart thermostat 10 including information for the control signals, temperature, temperature points set by the user, acceptable energy costs associated with each of the temperature setpoints and passes the information to the computer system 62. The computer system 62 then recomputes the current energy price based upon the user temperature setpoints and the associated acceptable energy cost levels in order to adjust the demand for energy according to the supply and passes the adjusted current energy price levels to the transmitter 66 to be issued via the communication network 50.

The computer system 62 receives information from human or electronic meter readers for the quantity of energy that has been used in the establishment operated by the smart thermostat 10. The software in the computer system 62 then directs the computer system 62 for computing the energy bill of the user of the smart thermostat 10. The transmitter 66 receives information for the energy bill from the computer system and issues the bill to the smart thermostat 10 via the communication network 50. When payment is authorized by the user of the smart thermostat 10, the receiver 64 receives information for the authorization via the communication network 50 and passed the authorization to the computer system 62 for further processing.

Optionally, the computer system 62 receives information for outages, announcements, promotions, or the like and passes the information to the transmitter 66 for transmission to the smart thermostat 10 or receives information from the receiver 64 for requests for service, alarms, outages, or the like transmitted from the smart thermostat 10.

Figure 3:
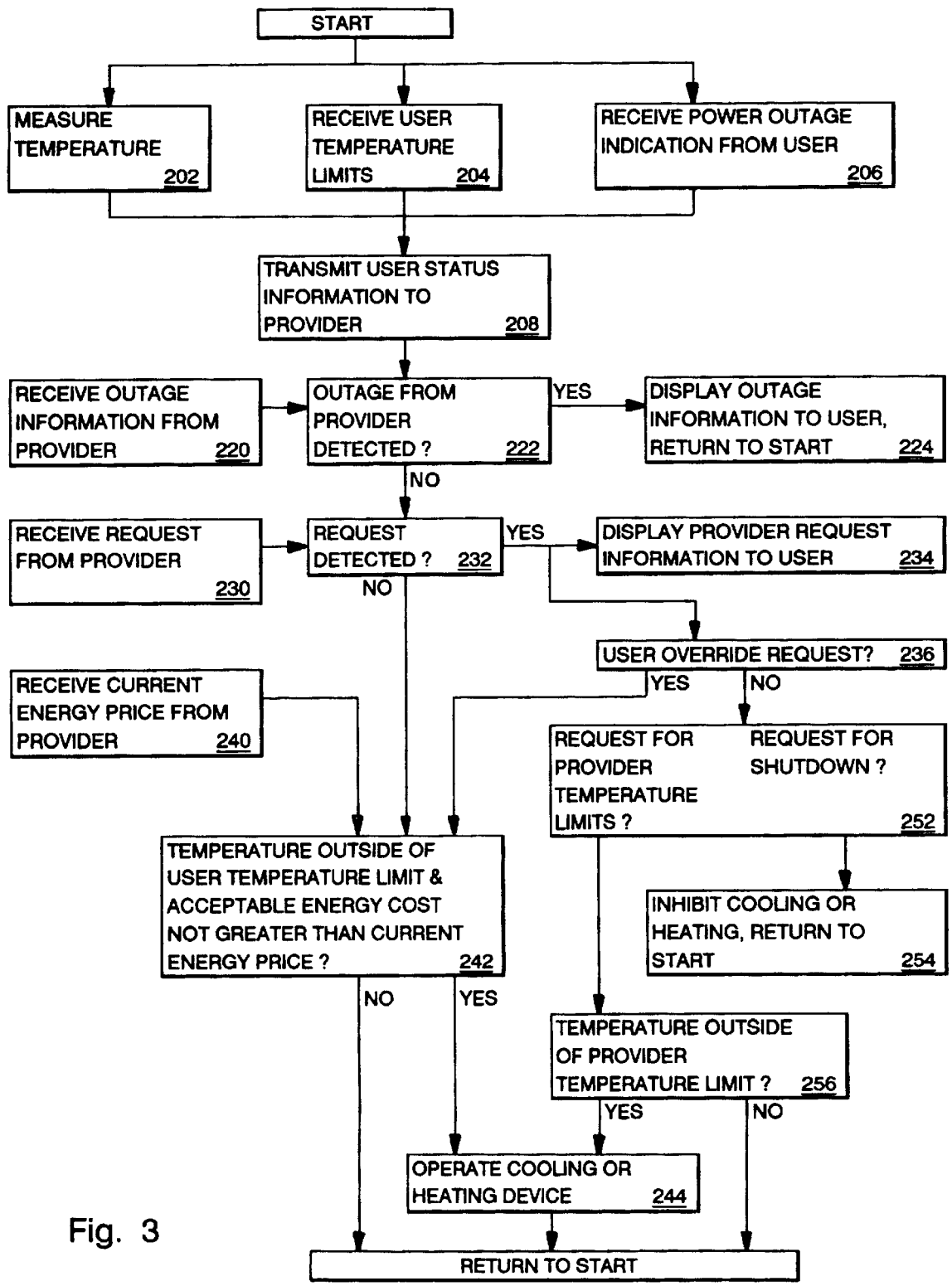
FIG. 3 is a flow chart of a method for using the smart thermostat of FIG. 1 for influencing energy demand.

FIG. 3 is a flow chart of a method for using the smart thermostat 10 for controlling energy use. In a step 202 the temperature sensor 12 measures a temperature. In a step 204 the user interface 13 receives information from a user for setting one or more user temperature setpoints and acceptable energy cost levels, respectively, for each of the temperature setpoints. The temperature setpoints may be designated as limits for controlling the cooling device 44, the heating device 46, or both. Typically several upper and/or several lower user temperature setpoints and associated acceptable energy costs, respectively, are entered where each succeeding setpoint indicates that the user is willing to accept a wider temperature variation when the cost of energy is higher. In a step 206 the user interface 13 may receive information entered by the user, such as a power outage, request for service, alarm, or the like, that is to be transmitted to the energy provider 60. The processor 30 collects the user status information from the user interface 13 and the port 32 and passes it to the transceiver 18. In a step 208 the transceiver 18 transmits the output signal including the user status information via the communication network 50 to the targeted energy provider 60. In a step 220 the transceiver 18 may receive the input signal via the communication network 50 having information indicating that a power outage is known by the energy provider 60 to have occurred for a particular type of energy, for example electricity, in the area controlled by the smart thermostat 10, and an expected time for a return of power. In a step 222 the processor 30 detects that the outage indication has been received and passes the information to the user interface 13. In a step 224 the user interface displays the outage information to the user.

In a step 230 the transceiver 18 may receive the input signal including request information issued by the energy provider 60 of a particular type of energy, for example electricity, via the communication network 50 requesting that one or more of the user's temperature setpoints be replaced with temperature setpoints that are issued by the energy provider 60 or that the control signal be issued so that the operation of the cooling device 44 and/or heating device 46 is shutdown, and may include information for the times that the request will be in effect. Optionally, the information may include announcements or promotions. In a step 232 the processor 30 detects the request and passes the request information to the user interface 13. In a step 234 the user interface displays the request information, announcements, and/or promotions to the user. In a step 236 the user interface 13 may receive an override by the user overriding the request by the energy provider 60.

In a step 240 the transceiver 18 receives the input signal having information for a current price of energy issued by the energy provider 60 via the communication network 50. The price may be a value in currency but is preferably a level such as low, medium, high, or critical. In a step 242 when no energy provider requests have been received or when they have been received but overridden, the processor 30 selects the user-entered temperature setpoint associated with the current energy price level. Where levels low, medium, high, and critical are used for the provider energy price, the temperature setpoint is selected that is associated with the current energy price level. The processor 30 then compares the temperature to the temperature setpoint that is selected and generates a control signal based upon the comparison as described in the detailed description accompanying FIG. 1 above. Where the temperature setpoint is designated for controlling the cooling device 44 the control signal includes control information to operate the cooling device 44 when the temperature is greater than the selected temperature setpoint. Where the selected temperature setpoint designated for controlling the heating device 46 the control signal includes control information to operate the heating device 44 when the temperature is less than the selected temperature setpoint. When no energy price is acceptable the cooling device 44 or heating device 46 is not operated. In a step 244 the processor 30 issues the control signal through the port 32 for operating the cooling device 44 or the heating device 46.

In a step 252, when a request from the energy provider 60 has been received and not overridden by the user, the processor 30 substitutes provider temperature setpoints for user temperature setpoints or inhibits operation of the cooling device 44 and/or heating device 46. In a step 254 when a complete shutdown is required, the processor 30 issues the control signal through the port 32 for inhibiting operation of the cooling device 44 or heating device 46. In a step 256 when provider setpoints are required, the processor 30 compares the temperature to the provider temperature setpoints and generates a control signal based upon the comparison in a similar manner to the step 242. Then in the step 244 the processor 30 issues the control signal through the port 32 for operating the cooling device 44 or heating device 46.

Figure 4:
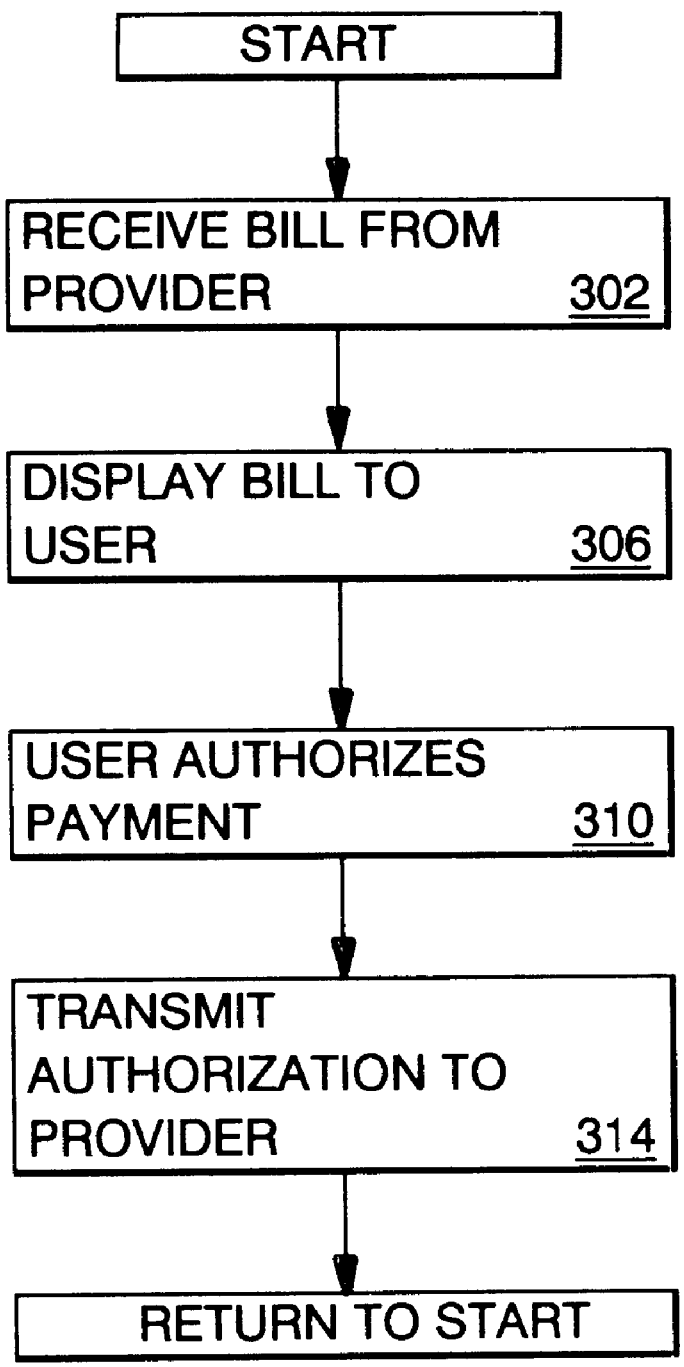
FIG. 4 is flow chart for using the smart thermostat of FIG. 1 for authorization of payment of an energy bill.

FIG. 4 is a flow chart of a method using the smart thermostat 10 for authorization of payment of the energy bill for usage of energy during a time period. In a step 302 the transceiver 18 receives the input signal including the energy bill issued by the energy provider 60 via the communication network 50. In a step 306 the processor 30 receives information for the bill from the transceiver 18 and passes the information to the user through the user interface 13. In a step 310 the user interface 13 may receive the authorization from the user for payment of the bill. The processor 30 receives information for the authorization from the user interface 30 and passes the authorization to the transceiver 18. In a step 314 the transceiver 18 transmits the output signal including the authorization via the communication network 50 to the targeted energy provider 60.

Optionally, the executable code 40 directs the processor 30 for calculating the energy bill instead of receiving it as described in the step 302 above. The transceiver 18 receives the input signal including current energy prices issued by the energy provider 60 via the communication network 50. The processor 30 calculates the quantity of energy used at each of the energy prices and computes the bill. In one embodiment, the cooling device 44 and/or the heating device 46 uses energy at a fixed and known rate when it is operating. The processor 30 calculates the quantity of energy used from this known rate that is stored in the variable data space 39 or the executable code 40 after being programmed with internal mini-switches at manufacture or installation, input through the user interface 13 by an authorized service person through an encrypted code, or downloaded through the transceiver 18 from the energy provider 60 via the communication network 50. In another embodiment, the processor 30 receives information from the energy measuring device 48 such as an electric meter or a gas meter for the energy used. The information from the energy measuring device 48 may be carried by the power wires of the user's establishment using a system such as the CEBus, by separate wires to the port 32, or through a wireless signals from the energy measuring device 48 to a base station and from the base station to the transceiver 18.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method using a smart thermostat for controlling energy usage, comprising steps of:

measuring a temperature with a temperature sensor;

receiving user input information from a user for at least one user temperature setpoint;

issuing a control signal based upon a comparison of said temperature and said user temperature setpoint for controlling operation of an apparatus for at least one of (i) using energy for cooling a space including said temperature sensor and (ii) using energy for heating a space including said temperature sensor; and transmitting an output signal to a provider of said energy, said output signal including at least one of (i) said user temperature setpoint and (ii) said temperature.

2. The method of claim 1, wherein:

said output signal is a wireless signal.

3. The method of claim 1, further including steps of:

receiving user input information from said user for an acceptable energy cost associated with said temperature setpoint;

receiving an input signal including a current energy price issued by said energy provider; and wherein;

said control signal is further based upon a comparison of said acceptable cost and said current energy price.

4. The method of claim 3, wherein:

the step of issuing said control signal further includes at least one of (i) issuing said control signal for controlling said apparatus for cooling said space when said temperature is greater than said temperature setpoint and said acceptable energy cost is not greater than said current energy price and (ii) issuing said control signal for controlling said apparatus for heating said space when said temperature is less than said temperature setpoint and said acceptable energy cost is not greater than said current energy price.

5. The method of claim 1, further including steps of:

receiving an input signal including a request from said provider of said energy for using a provider temperature setpoint; and substituting said provider temperature setpoint for said user temperature setpoint in the step of issuing said control signal.

6. The method of claim 1, further including a step of:

receiving an input signal including a request to inhibit said operation for using energy; and wherein:

the step of issuing said control signal includes a step of issuing said control signal for inhibiting said operation.

7. A method for paying an energy bill for use of energy, including a steps of:

displaying said energy bill to a user of said energy;

receiving user input information from said user for an authorization of payment of said bill; and transmitting an output signal to a provider of said energy, said output signal including said authorization.

8. The method of claim 7, further including a step of:

receiving an input signal including said bill issued by said energy provider.

9. The method of claim 7, further including steps of:

receiving an input signal including a current energy price issued by said energy provider;

calculating an accumulated use of said energy; and calculating said energy bill based upon said current energy price and said accumulated use of said energy.

10. A smart thermostat, comprising:

a temperature sensor for measuring a temperature;

a user interface including a user entry device for receiving user input information including at least one user temperature setpoint;

a port for issuing a control signal for controlling an apparatus for using energy for operating at least one of (i) a cooling apparatus for cooling a space including said temperature sensor (ii) a heating apparatus for heating a space including said temperature sensor;

a processor coupled to the temperature sensor, the user interface, and the port, the processor including an executable code for directing the processor for determining said control signal based upon a comparison of said temperature and said temperature setpoint, and issuing user status information including at least one of said temperature and said temperature setpoint; and a transceiver including a transmitter coupled to the processor for transmitting an output signal including said user status information to a provider of said energy.

11. The smart thermostat of claim 10, wherein:

the transceiver is a wireless transceiver.

12. The smart thermostat of claim 10, wherein:

said user entry device is further for receiving user input information for an acceptable energy cost associated with said temperature setpoint;

the transceiver further includes a receiver for receiving an input signal including a current energy price issued from said energy provider; and said executable code is further used for directing the processor for determining said control signal further based upon said acceptable cost of energy and said current energy price.

13. The smart thermostat of claim 12, wherein:

said executable code is further for directing the processor for at least one of (i) determining said control signal for controlling said apparatus for cooling said space when said temperature is greater than said temperature setpoint and said acceptable energy cost is not greater than said current energy price and (ii) determining said control signal for controlling said apparatus for heating said space when said temperature is less than said temperature setpoint and said acceptable energy cost is not greater than said current energy price.

14. The smart thermostat of claim 10, wherein:

the transceiver further includes a receiver for receiving an input signal including a request from said energy provider for substituting a provider temperature setpoint for said user temperature setpoint; and said executable code is further used for directing the processor for substituting said provider temperature setpoint for said user temperature setpoint for said comparison to said temperature for determining said control signal when said request is received.

15. The smart thermostat of claim 10, wherein:

the transceiver further includes a receiver for receiving an input signal including a shutdown request from said energy provider; and said executable code is further used for directing the processor for inhibiting said operation when said shutdown request is received.

16. A smart thermostat, comprising:

a display for displaying an energy bill for use of energy to a user;

a user entry device for receiving an authorization for payment of said bill from a user; and a transmitter for transmitting an output signal including said authorization to a provider of said energy.

17. The smart thermostat of claim 16, further including:

a receiver for receiving an input signal including information for said bill from said energy provider.

18. The smart thermostat of claim 16, further including:

a receiver for receiving an input signal including information for a current energy price issued by said energy provider; and a processor coupled to the receiver and including an executable code for calculating an accumulated use of said energy and calculating said energy bill based upon said current energy price and said accumulated use of said energy.

19. A method by an energy provider for managing energy, comprising:

at said energy provider, receiving at least one user temperature setpoint and an associated acceptable cost from a user of said energy for maintaining a temperature at least one of (i) lower than said user temperature setpoint and (ii) higher than said user temperature setpoint from at least one energy user; and predicting a change in demand for said energy that will result from a change in a current price of said energy.

20. The method of claim 19, further including steps of:

calculating said current price based upon said user temperature setpoint and said acceptable energy cost for adjusting said demand; and issuing information for said current price to said user.

21. A method for authorization of payment of an energy bill, comprising:

issuing information for said energy bill from an energy provider through a communication network for reception by a user of said energy; and at said energy provider, receiving through said communication network an authorization for payment from said user.

22. A smart thermostat for use at an establishment of a user of power, comprising:

a port coupled for receiving an automatic indication when said power is not available at said establishment; and a transmitter coupled to the port for transmitting an output signal including information for a power outage to a provider of said power when said indication indicates that said power is not available.

23. The thermostat of claim 22, wherein:

said power is electrical power.

24. The thermostat of claim 22, wherein:

said power is gas power.

25. The thermostat of claim 22, further including:

a receiver for receiving an input signal having a confirmation that said power outage is known by said power provider; and a display for displaying said confirmation in a form that is visually or audibly perceptible to a human user.

26. The thermostat of claim 25, wherein:

said confirmation includes information for a time when said power is expected to return.

27. A method for communicating information from an establishment using power to a provider of said power, comprising steps of:

receiving an automatic indication when said power is not available at said establishment; and transmitting an output signal including information for a power outage to a provider of said power when said power is not available.

28. The method of claim 27, wherein:

said power is electrical power.

29. The method of claim 27, wherein:

said power is gas power.

30. The method of claim 27, further including steps of:

receiving an input signal having a confirmation that said power outage is known by said power provider; and displaying said confirmation in a form that is visually or audibly perceptible to a human user.

31. The method of claim 30, wherein:

said confirmation includes information for a time when said power is expected to return.

32. A smart thermostat for use at an establishment of a user of power, comprising:

a signal receiver for receiving an input signal having information of a power outage from a provider of said power; and a display for displaying said information for said power outage in a form that is visually or audibly perceptible to a human user.

33. The thermostat of claim 32, wherein:

said power is electrical power.

34. The thermostat of claim 32, wherein:

said power is gas power.

35. The thermostat of claim 32, wherein:

said information for said power outage includes at least one of (i) a time that said power will be out at said establishment, (ii) information that said power is currently out at said establishment, and (iii) a time when said power is expected to return to said establishment.

36. A method for receiving information at an establishment using power from a provider of said power, comprising steps of:
   receiving an input signal having information for a power outage from said provider of said power; and
   displaying said information for said power outage in a form that is visually or audibly perceptible to a human user.

37. The method of claim 36, wherein:
   said power is electrical power.

38. The method of claim 36, wherein:
   said power is gas power.

39. The method of claim 36, wherein:
   said information for said power outage includes at least one of (i) a time that said power will be out at said establishment, (ii) information that said power is currently out at said establishment, and (iii) a time when said power is expected to return.

* * * * *